United States Patent Office 3,301,592
Patented Jan. 31, 1967

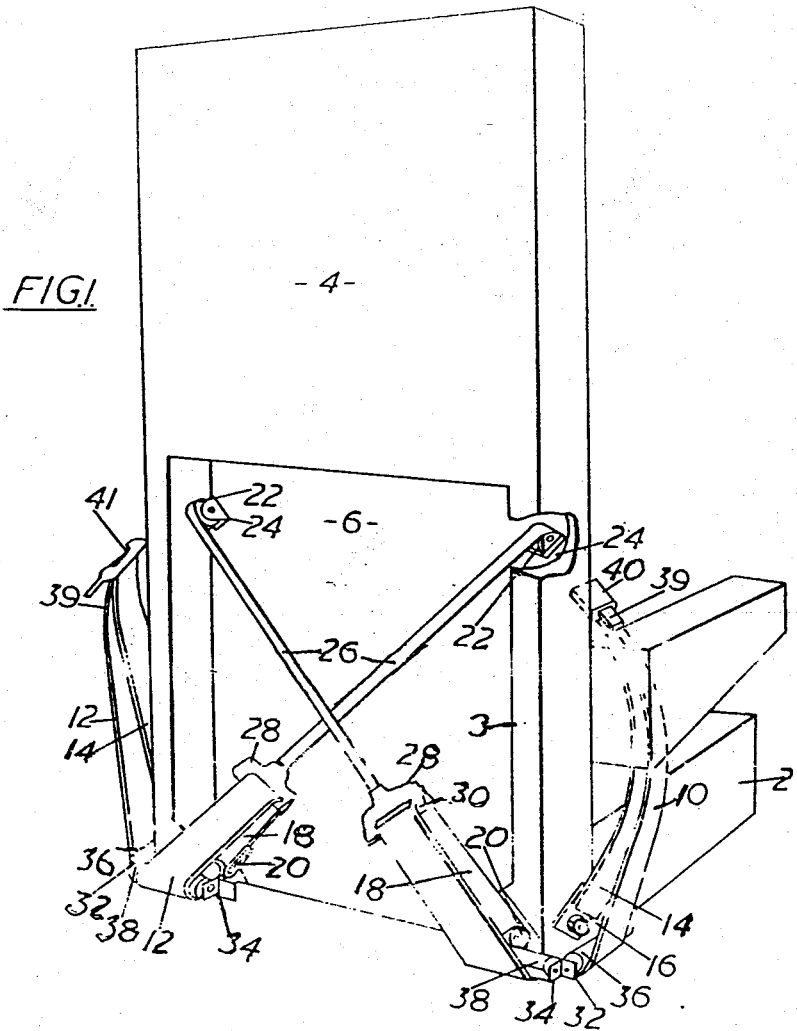
FIG I
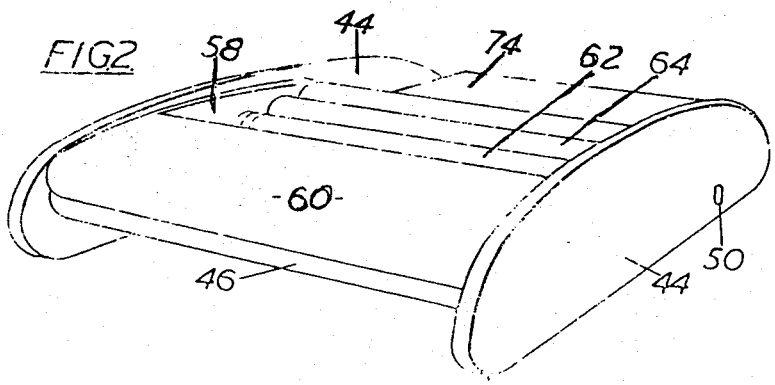
FIG 2

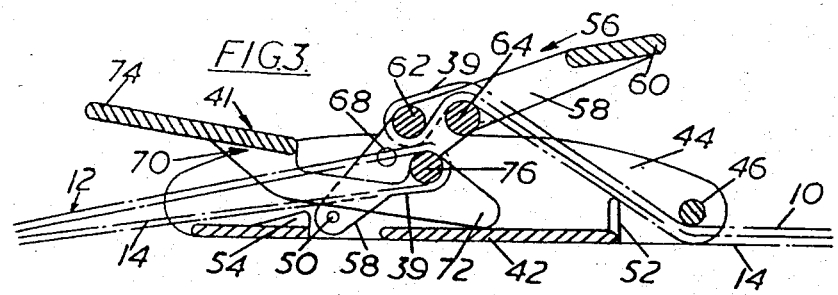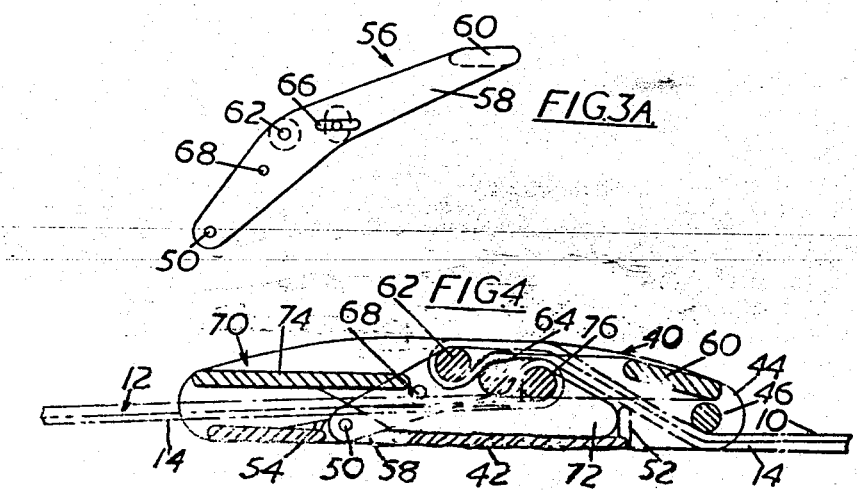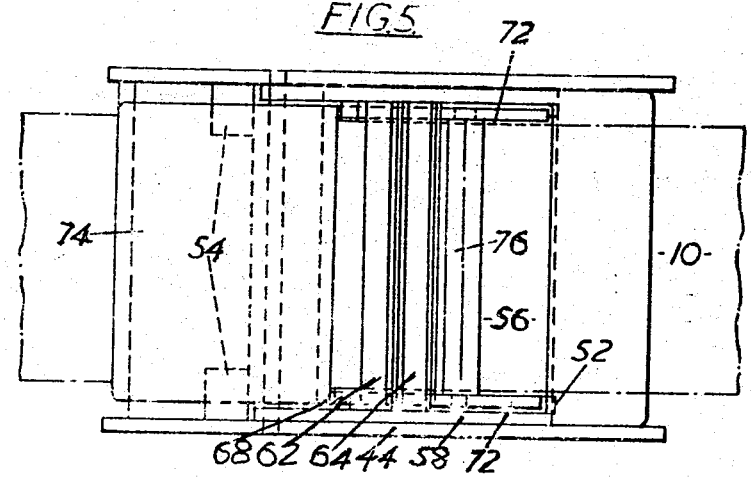

3,301,592
SECURING DEVICES
Arthur Herbert McFarlane, Basildon, and Eric Herbert Spouge, Harold Hill, both of England, assignors to Teleflex Products Limited, London, England, a company of Great Britain and Northern Ireland
Original application Nov. 14, 1962, Ser. No. 237,454. Divided and this application Oct. 11, 1965, Ser. No. 494,504
5 Claims. (Cl. 297—385)

The present application is a division of application Serial No. 237,454, filed November 14, 1962, and relates to securing devices. Examples of such securing devices are safety belts or harnesses which are fitted to seats to prevent or limit movement of a person seated thereon during acceleration and deceleration of the seat and straps or other elongated flexible members used to secure or hold articles in position, for example during transit of the articles.

One of the difficulties, particularly with seat straps in aircraft or other vehicles is that the buckle ends of the straps are either left lying on the seat or are allowed to hang down. If left on the seat they are uncomfortable to sit down on and not easy to withdraw when so seated whilst if moved off the seat they drop between the seats and are difficult to retrieve.

It is usual to make the straps so that the lengths can be adjusted by each individual occupant of the seat but the means for adjustment at present provided are often not easy to manipulate so that it not infrequently happens in practice that the seat straps are not really properly adjusted and are generally too loose, a fact which is not readily noticeable to the eye.

The above disadvantages could be overcome by fitting inertia controlled take-up reels for the straps but such equipment is expensive besides adding considerable weight.

One of the objects of the present invention is to provide a device which will overcome one or more of the above disadvantages.

Another object of the present invention is to provide a retractable restraining device for use by passengers which is easy to extend and apply and which embodies locking means which automatically locks if the strap is pulled by movement of the body to which it has been applied but does not lock when the strap is extended for applying to the body.

Another object of the present invention is to provide in a safety harness a two-part buckle for securing together the running bights of two belts, one end of each belt being anchored while the other end is connected to a take-up device so that when the two parts of the buckle are engaged, with the straps in position for holding a passenger in a vehicle seat or for holding a package in a vehicle cargo site, the act of locking the two parts of the buckle clamps said parts onto the belts to restrain the withdrawal of both belts from the take-up devices.

A further object of the invention is to arrange the belt-bight receiving elements of the buckle parts so that in the locked position an increased load on the belts increases the clamping action onto the belts.

A still further object of the invention is to porvide a two piece buckle such that an over-centre arrangement of the bight receiving elements of the buckle parts is achieved so that the load on the belts holds the buckle parts locked against accidental disengagement.

The invention provides a safety harness assembly including a strap, strap fastening means on said strap and anchorable resilient take up means engaged with said strap said strap being connectable between an anchorage point and said resilient take up means wherein locking means are provided which when actuated lock on said strap, the arrangement when assembled being such that when the fitting is unlocked the take-up device will tend to move said fitting to a stowing position and when said fitting is locked or being pulled on the main strain will be taken by the anchorable end of the strap and not be transmitted to the end connected to the take-up device. The strap preferably forms a loop with the strap fastening means located at the end of said loop.

The invention provides, in another of its aspects, a lap belt for a safety belt or harness, comprising two assemblies each as aforesaid and adapted to be connected together by a single common two-part buckle or other fitting (hereinafter called a "buckle") whereby when the belt is worn and two parts of the buckle are engaged and locked, the said straps extend around the wearer's waist and the buckle parts are locked to the anchorable ends of the straps.

More particularly, one embodiment of the invention provides a two-part buckle for use on at least one running bight of two belts, one end of the belt of said bight being adapted to be anchored while the other is adapted to be connected to a take-up device. This two-part buckle comprises a first buckle part and a second buckle part, the first part having a pivoted lever mountable between a locked and an unlocked position. A fixed rod is located on the pivoted lever for the end of the bight of one belt, the fixed rod being positioned so that the pull of the belt urges the lever towards the locked position. A movable rod is mounted for lateral movement on the lever towards the fixed rod and outside the bight. An abutment on said first part is located for engagement by the other buckle part and is situated on the side of said movable bar remote from said fixed bar, the second part having an abutment engaging portion and a fixed bar for the end of the bight of the other belt which is adapted, when inserted into said first part, and pass beneath said fixed and movable bars on the first buckle part, the axes of said three bars being located on said first and second buckle parts so that in the locked position of said lever both belts are clamped to the fixed bars.

Conveniently the common buckle may be constructed so that the shoulder straps of a safety harness can be attached thereto.

The invention itself however, both as to its construction and its method of operation together with additional objects and advantages thereof will be best understood from the following detailed description with reference to the accompanying drawings in which:

FIGURE 1 is a diagrammatic perspective rear view of a seat to which one form of safety harness assembly in accordance with the present invention has been fitted;

FIGURE 2 is a perspective view of the two-part buckle of the invention shown only generally in FIGURE 1;

FIGURE 3 and 4 are sectional views of the fitting shown in FIGURE 2 showing the parts in the unlocked and locked positions respectively;

FIGURE 3A is a side view of a portion of the buckle;

FIGURE 4 is a plan view of FIGURE 2 with the belts indicated by chain lines.

As will be seen from FIGURE 1 the frame of the seat comprises a seat portion 2 and a back 4 the lower part 6 of which is uncovered, to show the uprights 8. The securing device is a lap belt comprising two straps 10 and 12 the ends 14 of which are securable by anchor plates 16 to the seat near the junction of the uprights 8 with the seat portion 2 whilst the other ends 18 of the straps are secured to the lower part of the back 6 at 20. Also mounted at the back of the seat and secured to the uprights 8 are two take-up devices 22 carried in brackets 24. These take-up devices consist of spring actuated rollers to which bands 26 are attached the free ends of which carry yokes 28 fitted with rollers 30 over which the belts 10 and 12 are passed. Mounted in suitable brackets 32 and 34 on each side of the seat 2 near the bottom of the uprights 8 and arranged at right angles to each other are pairs of rollers 36 and 38. The belts 10 and 12 pass over these rollers 36 and 38 and are retained in position thereon by guides which are not shown since any convenient form of well known belt guide will suffice. Each of the straps 10 and 12 are threaded through one part of a two part buckle 40, 41 as shown in FIGURE 1.

Turning now to FIGURES 2 to 5 in which the two part buckle constituting the fitting is illustrated it will be seen that the first buckle part 40 consists of a base 42 having upstanding side wings 44 between which is mounted a bar 46 and a pivot pin 50. Also formed in one with the base 42 are abutments 52 and guides 54. Mounted on the pivot pin 50 is the clip part 56 constituing a pivoted lever to which a loop, or running bight, of the strap 10 is attached. The clip part 56, which is best illustrated in FIGURES 3 and 3A, comprises two side arms 58 connected together by a hand bar 60, a fixed rod 62 and a movable rod 64 the reduced ends of which are slidably mounted in short slots 66 provided in the side arms 58. The side arms 58 are also provided with short pegs 68. As will be seen, the inner and outer runs of the strap 10 pass beneath the bar 46 over the movable rod 64 and around the fixed rod 62. The other and separable part of the buckle comprises the second clip part 70 which has two side members 72 joined together at one end by a hand plate 74 and at the other end by a bar 76. As will be seen from FIGURES 3 and 4 the inner and outer runs of strap 12 pass beneath the hand plate 74 and form a loop, or bight, around the bar 76.

To assemble the two parts of the buckle the clip part 70 is held by the hand plate 74 and the bar 76 inserted into the clip part 56 and directed by the guides 54 will pass above the pivot pin 50 but beneath the pegs 68 in the manner shown in FIGURE 3. When the bar 76 has has been inserted past the bar 64 the front of the plate 74 engages the pegs 68 moving the clip part 56 to a partly closed position. The hand plate 60 is now pressed down so that the parts assume the position shown in FIGURE 4 with the three bars 62, 64 and 76 in near alignment with the bar 64 slightly below the bars 62 and 76 to provide an over-centre toggle action. It will be noted that the side members 72 contact the abutments 52. In this position the strap 10 is pressed hard against the bar 62 by the pressure of the pull of the strap 12 on the bar 76 pressing the loop of the strap around this bar against the movable bar 64 and by the pressure of the side members 72 against the abutments 52. The construction as will readily be seen is such that no pull on the straps 10 and 12 could cause the buckle to come unfastened. In this position also the loops of the straps 10 and 12 around the bars 62 and 76 are nipped so firmly that any pull on the buckle ends of the straps will be transmitted to the ends 14 and anchor plates 16 directly to the seat of the chair since no part of the straps can be drawn through the buckle parts. To unfasten the buckle the hand plate 60 is raised whereon the pull of the take up devices 22 acting through the bands 26 and yokes 28 will tend to separate the two parts and if these are left free the take up devices will draw the straps through the buckle parts in which they are now free until these have been withdrawn to a storage position. To refasten the seat belt all that has to be done is to pull on the two buckle parts until they are approximately in a central position in the lap end and then engage and lock them as described above.

Stop means not shown may be provided at the sides of the seat to prevent the take-up means from withdrawing the buckle parts too far.

The foregoing buckle may conveniently be provided with anchorage points to which shoulder straps may be attached. The shoulder straps may themselves be retractable either as described above in relation to lap straps or by conventional inertia reels.

The foregoing construction has the susbtantial advantage that during non-use the straps are stowed by a take-up device but during use, the tension that can be taken by the strap is not dependent on any locking, either automatically as in the case of an inertia take-up reel, or manually as in the case of a hand locked reel, of the take-up device. The tension in the straps is taken by the fixedly anchored ends since the buckle prevents lengthwise movement of the straps therethrough. The straps are automatically secured to the buckle by the action of locking the buckle as the lap belt is put on by a person seated in the seat and any slack in the belt is taken up automatically by the take-up devices before the buckle parts are moved to the locked position.

The invention is not restricted to the details of the foregoing example. Thus, in the case of a lap belt, the buckle may be of any suitable construction which can prevent increase in the lengths of the portions of the straps between the buckle and the anchored ends whilst permitting the take-up devices to draw the straps through the buckle to take up any slack. A device embodying the invention may conveniently be used to secure articles in position. For instance, if an article is to be secured to the floor of a vehicle, vessel or aircraft, one end of an anchorage strap would be fixedly anchored to the floor at one side of the article, the strap looped and the other end attached to a take-up device. That device may conveniently be disposed adjacent the anchored end of the strap. The looped portion of the strap would pass through a buckle or other fitting which may be engageable with a co-operating part fixedly secured to the floor at the other side of the article. The strap could then be passed over the article, drawn tight and the buckle or like fitting engaged with its co-operating buckle part or like fitting. The engaging action could be made to lock the fitting to strap or the fitting could be locked to the strap in some other way.

The foregoing description is considered illustrative only of the principles of the invention. Further, since numerous modifications and changes will readily occur to those skilled in the art, it is not desired to limit the invention to the exact construction and operation shown and described and accordingly all suitable modifications and equivalents may be resorted to which fall within the scope of the invention as claimed.

We claim:

1. A two-part buckle for use on a belt having at least two runs forming a running bight, one of said runs being anchored, the other of said runs being connected to a take-up device; said two-part buckle comprising a first buckle part and a second buckle part, said first part having a pivoted lever movable between a locked and an unlocked position; a fixed rod on said pivoted lever for said running bight, said fixed rod being positioned so that the pull of said belt urges the pivoted lever toward the locked position; a movable rod mounted for lateral movement on said lever towards said fixed rod and outside said bight; and an abutment on said first buckle part for engagement by said second buckle part and situated on the side of said movable rod remote from said fixed rod; said second part having an abutment-engaging portion and a fixed bar, said fixed bar passing beneath said fixed and movable rods on the first buckle part when said second buckle part is inserted therein; the axes of said fixed and movable rods and said fixed bar being parallel and arranged so that when said pivoted lever is moved to its locked position said running bight is locked.

2. The two-part buckle of claim 1 wherein the axes of said fixed and movable rods and said fixed bar are substantially in line when said pivoted lever is in the locked position.

3. The two-part buckle of claim 1 wherein the fixed bar of said second buckle part is slightly over-centre with respect to the fixed and movable rods of the first buckle part when said lever is in the locked position.

4. A safety harness assembly including first and second straps, two-part buckle means for fastening said straps, at least one anchorable take-up device for tensioning said straps, said first strap being connected by one end to said take-up device and by the other end to a fixed anchorage to form a loop to which a first part of said buckle is attached, the second part of said buckle being attached to said second strap, said two-part buckle embodying locking means including a pivoted lever mounted on said first buckle part and movable between a locked and unlocked position, a first fixed transverse bar for said loop on said lever, a movable transverse bar mounted for lateral movement on said lever, and a second fixed transverse bar on said second buckle part, said strap being wedged between said bars when said buckle is closed.

5. The safety harness assembly of claim 4 wherein said first buckle part further includes an abutment for engagement by said second buckle part, said second fixed bar passing beneath said first fixed bar and said movable bar when said second buckle part is inserted into said first buckle part, the axes of said fixed and movable rods being parallel and arranged so that when said pivoted lever is moved to its locked position said first strap is wedged between said bars to prevent said strap from being drawn through said buckle in the direction to cause said take-up device to pay out.

References Cited by the Examiner

UNITED STATES PATENTS

| | | | |
|---|---|---|---|
| 350,226 | 10/1886 | Youmans | 24—193 |
| 1,712,584 | 5/1929 | Robinson | 24—193 |
| 1,962,285 | 6/1934 | Robinson | 24—193 |
| 2,679,670 | 6/1954 | Griswold | 24—68 |
| 2,997,761 | 8/1961 | Davis | 24—196 |
| 3,020,089 | 2/1962 | Monroe | 297—388 |
| 3,100,669 | 8/1963 | Monroe | 297—388 |

FRANK B. SHERRY, *Primary Examiner.*

R. B. FARLEY, *Examiner.*

J. T. McCALL, *Assistant Examiner.*